United States Patent [19]

Sterner

[11] Patent Number: 4,732,724
[45] Date of Patent: Mar. 22, 1988

[54] PROCESS OF MAKING INJECTION MOLDINGS AND INJECTION MOLD FOR CARRYING OUT THE PROCESS

[76] Inventor: Franz Sterner, Mühlstrasse 21, A-4614 Marchtrenk, Austria

[21] Appl. No.: 709,326

[22] Filed: Mar. 7, 1985

[30] Foreign Application Priority Data

Mar. 21, 1984 [AT] Austria ............................ 944/84
Aug. 7, 1984 [AT] Austria ........................... 2250/84

[51] Int. Cl.⁴ ............................................. B29C 45/22
[52] U.S. Cl. ........................... 264/251; 264/40.5; 264/255; 264/273; 264/328.8; 264/328.9; 264/328.11; 264/328.15; 264/328.16
[58] Field of Search .................... 264/405, 255, 328.1, 264/251, 328.2, 328.8, 328.9, 328.11, 328.15, 328.16, 273; 425/543, 568, 569, 570, 571

[56] References Cited

U.S. PATENT DOCUMENTS

| | | | |
|---|---|---|---|
| 3,052,925 | 9/1962 | Bronnenkant et al. | 425/571 X |
| 3,270,115 | 8/1966 | Novel | 425/563 |
| 3,707,265 | 12/1972 | Seres | 264/328.9 X |
| 3,840,312 | 10/1974 | Paulson et al. | 425/149 |
| 4,442,055 | 4/1984 | Oelsch et al. | 264/328.2 X |

FOREIGN PATENT DOCUMENTS

| | | | |
|---|---|---|---|
| 2612176 | 10/1977 | Fed. Rep. of Germany | 264/328.2 |
| 47-27797 | 7/1972 | Japan | 264/328.2 |
| 56-5746 | 1/1981 | Japan | 264/328.15 |

Primary Examiner—Jan H. Silbaugh
Assistant Examiner—MaryLynn Fertig
Attorney, Agent, or Firm—Kurt Kelman

[57] ABSTRACT

An injection mold comprises two or more mold sections, which enclose a cavity for molding an injection-molded part. The mold cavity is adapted to be supplied with the molding material through at least one entrance opening. The injection mold is maintained at a temperature at which the molding material is set. Said molding material is injected in a liquid state at a greatly differing temperature. To simplify the injection molding operation, to avoid damage by the removal of sprues, and to accelerate the manufacture, the molding material is injected through the entrance opening directly into the cavity by means of at least one injection nozzle. The injection mold comprises an injection nozzle having a nozzle tip which fits the entrance opening.

2 Claims, 10 Drawing Figures

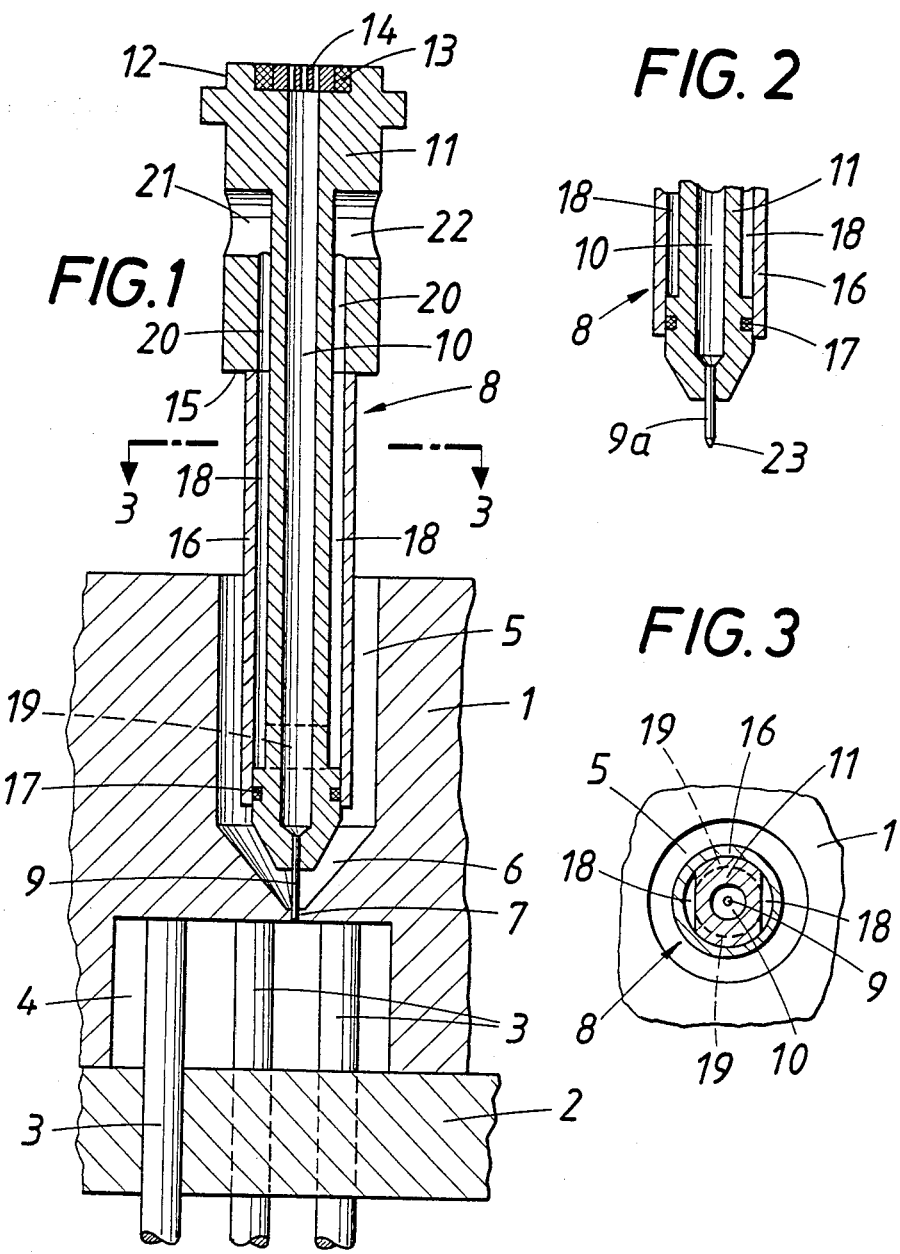

PROCESS OF MAKING INJECTION MOLDINGS AND INJECTION MOLD FOR CARRYING OUT THE PROCESS

BACKGROUND OF THE INVENTION

1. Field of the Invention

This invention relates to a process of manufacturing injection moldings in an injection mold which comprises at least two mold sectons, enclosing a molding cavity adapted to be supplied with the molding material through at least one entrance opening formed in one of said mold sections, in which process the mold is maintained at a solidification temperature for the molding material injected in a liquid state at a different temperature and consisting particularly of plastic material or another hot-settable or hot-vulcanizable material.

This invention relates also to an injection mold for a manufacturing injection moldings by said process, which mold comprises at least two mold sections adapted to be temperature-controlled at least in part and enclosing a molding cavity adapted to be supplied with molding material through at least one entrance opening formed in one of said mold sections.

2. Description of the Prior Art

If there is a relatively large temperature difference between the molding material and the mold in the known manufacture of injection moldings, the entrance opening merging into the cavity is provided at the end of a feed passage formed in the mold. Molding material is supplied to the cavity from an injecting machine or from a mixer. Injecting machines are preferably used in the processing of materials which solidify as they are cooled, such as thermoplastics, e.g., PVC, and injection machines or mixers are used for processing hot-settable or hot-vulcanizable materials, which are supplied as liquid silicones or rubber. Relatively small injection moldings can be made in a multi-cavity mold, which has a spider gate consisting of runners extending radially from a central sprue. The feed passages and the spider gate are at the same temperature as the mold so that the injected material solidifies in said passages and after the molding operation the injection moldings must be severed from the ends of the sprues or spiders. This operation is difficult and involves damage to the surface of the molding and a formation of flashes at the junction to the sprue so that the injection moldings may not be satisfactory for applications involving high requirements, e.g., in electric or electronic products. The material of the sprues or spiders is lost although in the manufacture of small injection moldings said material may have a larger mass than said moldings. Said material cannot be recycled if it consists of fully vulcanized rubber or of solidified two-component material. As it is not possible in numerous cases exactly to control the quantity of each batch which is supplied, excess molding material is used most cases in. This fact and other factors, such as a supply of material in surges or the provision of overflow pockets for receiving excess material in injection molds for molding rubber will result in a formation of flashes on the injection moldings, e.g., at the parting lines of the mold so that the molding must subsequently be machined. In the filling of complicated molds or multi-cavity molds, difficulties may arise during the filling of the mold owing to the air which is enclosed in the hollow space consisting of the cavity and feed passages. For this reason the temperature difference between the injected material and the mold can be controlled only with difficulty. For instance, in the processing of two-component liquid silicones the temperature of the molding material in the feed region should not exceed 20° to 40° C. but the cavity may have to be heated to, e.g., 240° C. in order to effect a solidification and to ensure that the injection molding has the desired final properties.

Owing to the difficulties outlined hereinbefore, numerous components are made by other processes and in different apparatus. Insulating silicone or rubber bushings for electronic equipment and computers have previously been made from mats by pressing in a multi-stage process. In said case a subsequent machining is also required to sever each bushing from the mat and to expose the openings of the bushings. Contact mats providing a carrying structure for the key fields of computers, pushbutton telephones and typewriters are also made from mats in a process in which individual contacts are made and placed on a baseplate, whereafter the mat material is applied and a pressing or injection molding operation is subsequently performed. Contact mats are often made in a plurality of layers, each of which extends throughout the area of the mat and consists of a single material. That material is expensive. Such mats have only a very small inherent stiffness and can be handled only with difficulty. For this reason the contact mats are installed by hand. This operation must be carefully performed in order to prevent a deformation of the mats under tension.

SUMMARY OF THE INVENTION

Itis an object of the invention to provide for the manufacture of injection moldings a process in which injection moldings can be made without a loss of material and without a loss of time for solidification, i.e., with minimum dwell times in the mold, as well as without a formation of visible sprues and without a formation of flashes so that the process may be used to advantage to make components previously made by other processes.

Another object of the invention is to provide an injection mold which is suitable for carrying out the process.

Other objects of the invention relate to the provision of simple means for an exact control of the material supply rate and the provision of a new and improved process of manufacturing contact mats, which process results in improved products.

The process in accordance with the invention is characterized by injecting the molding material directly into the cavity through a tip of the injection nozzle extending through the entrance opening, and conducting the molding material from the injection nozzle through a passage defined by said injection nozzle tip and having a flow area not in excess of one square millimeter immediately before the molding material is discharged into the cavity while greatly restricting the heat conduction between the injection nozzle tip and the injection nozzle.

This permits a satisfactory control of the temperature difference between the liquid material being supplied and the mold. Because the material is directly injected there are no sprues and if the mouthpiece of the injection nozzle is properly designed the locations at which the material has been injected into the cavity will not be visible on the molding and in case of need may be located in a recess of the injection molding. If the material has a relatively low viscosity, the material is injected into the mold as a fine jet through the small flow area at the tip of the nozzle. The material is at a controlled temperature (for instance, silicone at 20° C., rubber at 120° C.) as it is supplied to the mold and the latter is maintained at the vulcanization or solidification temperature (which amounts to 180° to 240° C. in the above-mentioned cases). As a result, the solidification takes place quickly and the molding can be removed from the mold immediately after the injecting operation. The air contained in the cavity can escape freely.

A new automatic control process can be adopted if an injection nozzle is used in which the flow area of the supply passage leading to the nozzle orifice is a multiple of the flow area of the nozzle orifice, the pressure of the molding material being supplied is monitored and automatically controlled during the injection molding operation and the pressure rise resulting when the cavity has been completely filled is used as a criterion for the complete filling of the cavity. In that case an automatic control in dependence on pressure can be used if a supply of molding material is provided in a reservoir. A formation of flashes at the parting lines between the mold sections can be avoided because the time in which material is supplied and the quantity of material which is supplied can be exactly controlled. Finally, the injection molding operation can be performed in such a manner that a hollow needle provided at the free end of the injection nozzle is introduced through the entrance opening into the cavity and is gradually pulled out of the cavity during the filling operation in dependence on the degree to which the cavity has been filled. In that case the point where the molding is separated from the feed at the end of the injecting operation may be located in the molding.

The process in accordance with the invention may be used not only to make injection moldings from synthetic thermoplastics but also for the manufacture of the following parts: Articles made of rubber and rubberlike material for hygienic purposes and for general use, seals, O rings, sealing elements and valve members directly molded around a valve stem, insulators directly molded on contacts of components, insulators, feed-through bushings and plug parts, also for delicate electronic appliances, contact mats for use in keyboards.

In the manufacture of contact mats which have humps having the shape of inverted bowls and are made in a mold having a suitable cavity from a material which has rubberlike elasticity in a solidified or vulcanized state, the process in accordance with the invention can be carried out in such a manner that molding material for each hump is injected into an entrance opening disposed at the center of such hump. As a result, the symmetrical elasticity of the humps and their long-term elasticity will be better than in contact mats made by other processes. Contact mats can also be made in that separate contact tablets made of conducting material are molded and the bowl-shaped humps of the mats are then molded in contact with such tablets unless it is desired to provide the mat with contact areas by plating with metal.

In the manufacture of contact mats, a carrying plate may be used, which consists of stiff material and which has apertures at the locations where the inverted bowl-shaped humps are to be provided, said plate is provided at the rims of said apertures with anchoring means, and the bowl-shaped humps made of a material of rubberlike elasticity are injection-molded in the injection mold in contact with said anchoring means. Owing to the provision of a relatively stiff carrier, the resulting contact mat can be handled even in assembling machines. In the known contact mats the resilient properties of the bowl-shaped humps will also depend on the manner in which the mat has been supported and at what distance from the elevations it has been supported. On the other hand, in the mat made by the process just described each bowl-shaped hump is supported by the stiffer plate so that the resilient properties will not be influenced by the support for the plate. The stiff plate can also be made by injection molding in the process in accordance with the invention.

The injection mold used to carry out the process is characterized by an injection nozzle which has a nozzle tip that is joined to or adapted to be engaged with one of said mold sections at the entrance opening, or to be inserted into the entrance opening, which has a diameter matching said tip.

For a control of the temperature difference, the nozzle tip particularly for an injection molding of hot-settable or hot-vulcanizable material has a small flow area of less than 1 square millimeter, preferably less than 0.5 square millimeter, and may be thin-walled and consist, e.g., of a hollow needle having a wall thickness of 0.05 to 0.5 millimeter and a bore which is at least 0.1 millimeter in diameter. The nozzle tip may be integrally formed with the end of the body of the injection nozzle and may be provided with heat insulation and may have length portions having a smaller wall thickness so that the heat transfer along the nozzle tip will be restricted. Heat-insulating inserts may be provided between an extension at the end of the nozzle body and the nozzle tip.

In an injection mold having a nozzle tip which is adapted to be introduced into the cavity, the nozzle tip may be introduced to extend below the parting line of the mold at the beginning of the injecting operation so that the air can escape at the parting lines of the mold. Since the nozzle has a small flow area and the heat conduction between the nozzle tip and the nozzle body is greatly restricted, a plug may form in the nozzle tip under certain conditions at the end of the injecting operation or when the injection molding machine is at a standstill. The formation of such plug may be desirable because it will prevent a dripping of additional material. The plug will be ejected at the beginning of the next injection molding cycle and will then be incorporated in the molding.

BRIEF DESCRIPTION OF THE DRAWINGS

FIG. 1 is a partly sectional view showing an injection mold for making insulating bushings.

FIG. 2 shows a modified end portion of the injection nozzle of FIG. 1.

FIG. 3 is a sectional view taken on line 3—3 in FIG. 1.

DETAILED DESCRIPTION OF THE PREFERRED EMBODIMENTS

Figure 4:
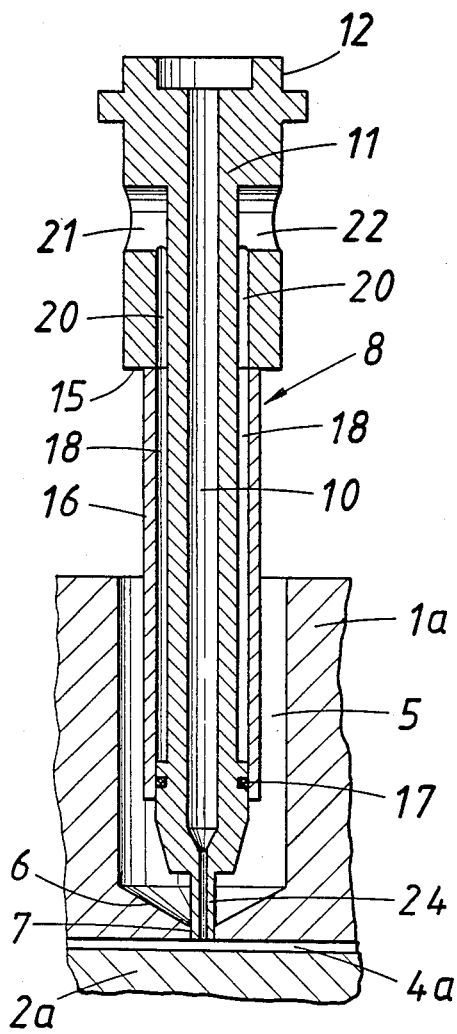
FIG. 4 is a partly sectional view that is similar to FIG. 1 and shows another injection mold for making relatively flat parts.

Further details and advantages of the process in accordance with the invention and of the injection molds provided for carrying out that process will become apparent from the following description of the drawings.

The injection mold shown in FIG. 1 comprises an upper section 1, a lower section 2 and pins 3, and serves to make contact feedthrough bushings of insulating material. The mold sections 1 and 2 enclose a cavity 4, which defines the desired external shape of the bushing. The pins 3 protrude into the cavity 4 through the mold section 2. To remove the molding, the mold section 1 is lifted off and thereafter the pins 3 are lowered or the mold section 2 is raised so that the molding is stripped off. The terms "upper" and "lower" are used only with reference to the drawing. The mold may be used in a position to which it has been rotated through 90° or 180° from that shown on the drawing.

The upper mold section 1 has a blind bore 5, which at its bottom slopes conically to an entrance opening 7. An injection nozzle generally designated 8 is contained in the blind bore 5 and is spaced from the wall of the bore 5 on all sides. The body of the injection nozzle 8 carries a nozzle tip, which consists of a hollow needle 9 and extends through the entrance opening 7. The free end of the hollow needle may be flush with the boundary surface of the cavity 4 or may slightly protrude into the cavity. The hollow needle 9 contains a nozzle orifice and opens into a bore 10 which is formed in an inner part 11 of the body of the injection nozzle 8 and which has a flow area that is a multiple of the flow area of the hollow needle 9. The bore 10 constitutes a supply passage communicating with the nozzle orifice. The inner body part 11 has at its upper end a port 12, by which the injection nozzle 8 can be connected to an injecting machine directly or by a connecting tube or manifold.

The port of the bore 10 is covered by a perforated sieve plate 14, which is disposed within a sealing ring 13 and has perforations which are smaller in diameter, e.g., by 0.02 millimeter, than the cylindrical bore in the hollow needle 9. In the processing of liquid silicones, the bore diameter of the hollow needle amounts to at least 0.01 millimeter. The wall thickness of the hollow needle should be at least 0.05 millimeter. The molding material is homogenized as it passes through the perforated plate 14, which retains impurities so that a clogging of the hollow needle will be prevented.

The body 11 of the injection nozzle 8 is formed with a shoulder 15 and from that shoulder 15 to a location near the end at which the hollow needle 9 is carried is chamfered on two diametrically opposite sides. At these chamfers, passages 18 are defined between the nozzle body 11 and a sleeve 16 which surrounds the nozzle body and is sealed at its free end by an O ring 17 and tightly adjoins the shoulder 15. Adjacent to the free end of the nozzle body the passages 18 are interconnected by cross-channels 19 formed in the outside surface of the body 11. Bores 20 extend from the shoulder 15 and connect the passages 18 to port bores 21, 22, which are adapted to be connected to a line for conducting a cooling fluid or a heat transfer fluid, which will flow in contact with a major part of the length of the nozzle body 11 extending in the bore 5 so that the nozzle body will be maintained at an optimum temperature for ensuring that the molding material will be maintained in a liquid state.

In accordance with FIGS. 1 the hollow needle 9 is permanently inserted into the opening 7 and the entire injection nozzle 8 is permanently connected to the upper section 1 of the mold.

In accordance with FIG. 2 the injection nozzle 8 carries a hollow needle 9a, which is conically tapered at its free end 23 and which for each injecting operation is introduced into and through an entrance opening 7 and is subsequently retracted. In that case one or more injection nozzles may be used with different injection molds provided with suitable blind bores 5 and entrance openings 7. A pressure sensor for monitoring the pressure applied to the molding material may be provided in the path along which the molding material is supplied, for instance, in a supply line connected to the bore 10. That pressure is lower during the injecting operation and during the filling of the cavity than from the instant at which the level of molding material in the cavity has reached the free end of the hollow needle 9. In accordance with FIG. 1, a controller may be provided, which interrupts the supply of molding material in response to the pressure rise. If the free end 23 of the hollow needle is introduced into the cavity in the embodiment shown in FIG. 2, a controller responds to the pressure rise by retracting the injection nozzle to a position in which the end 23 of the hollow needle is flush with the boundary surface of the cavity, and the controller interrupts the supply of material when that position has been reached.

The embodiment shown in FIG. 4 differs from the embodiment shown in FIGS. 1 to 3 essentially only in that a different cavity 4a is enclosed by the injection mold, which again consists of upper and lower sections 1a, 2a, and that the inner nozzle body 11 is integrally formed with a nozzle tip 24. In the embodiment shown in FIG. 4 the nozzle tip 24 has a uniform, small wall thickness and fits in the entrance opening 7.

Figure 5:
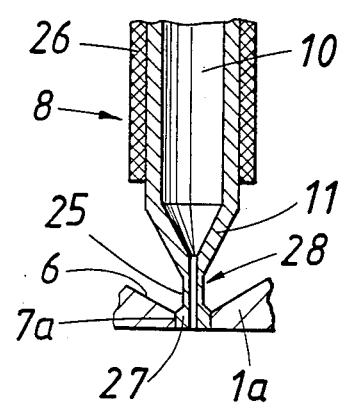
FIG. 5 shows another embodiment of the nozzle tip of the injection nozzle of the injection mold of FIG. 4.

In the embodiment shown in FIG. 5 an injection nozzle 8 is provided with a cooling jacket 26 and comprises a nozzle body 11 integrally formed with a nozzle tip 25. The nozzle tip has an enlarged head portion 27 and between that head portion and the nozzle body 11 has a constricted portion 28. Head portion 27 fits a correspondingly sized opening 7a of the upper mold section 1a. The constricted portion 28 limits the heat transfer from the head portion 27, which is heated in contact with the mold section 1a, and the part 11 and during the injection of hot molding material prevents a cooling of the nozzle tip beyond the constricted portion. The wall thickness at the constricted portion 28 may be less than 0.5 millimeter.

Figure 6:
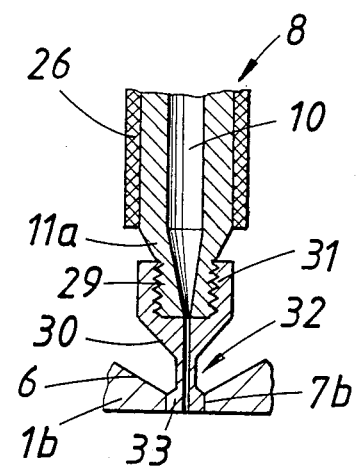
FIG. 6 is a sectional view showing another embodiment of the nozzle tip.

In accordance with FIG. 6 the nozzle body 11a has a screw-threaded extension 29 and a nozzle tip 30 has been screwed on said extension 29. The nozzle tip 30 comprises a screw-threaded portion 31, a constricted portion 32 and a head portion 33. The head portion 33 extends into the entrance opening 7b of the upper mold section 1b.

Figure 7:
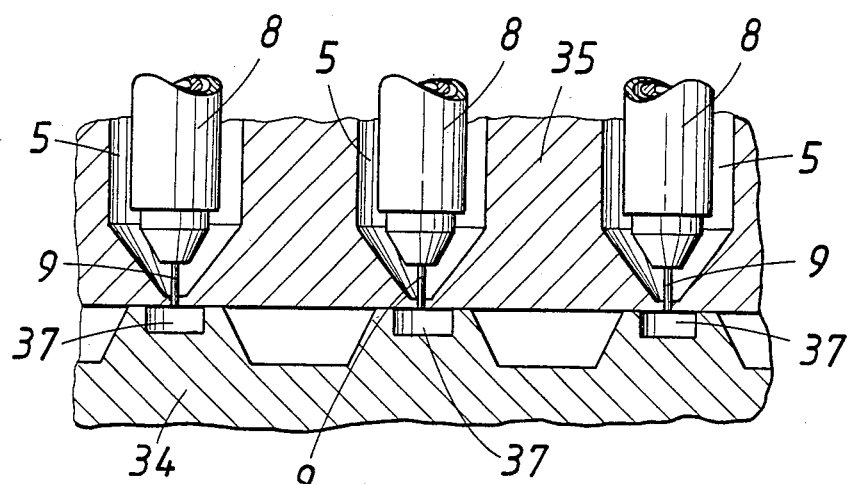
FIG. 7 is a partly sectional view showing a change mold for making a contact mat, with first and second mold sections cooperating with each other.
Figure 8:
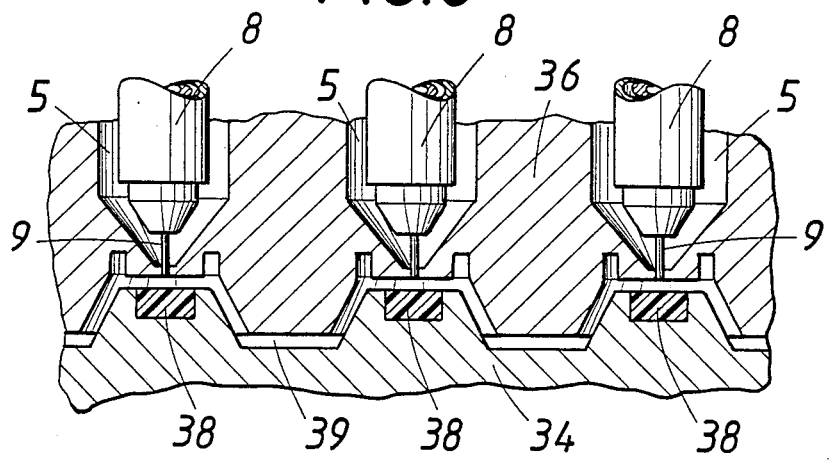
FIG. 8 is a partly sectional view which supplements FIG. 7 and shows a change mold with the first mold section and a third mold section cooperating with each other.
Figure 9:
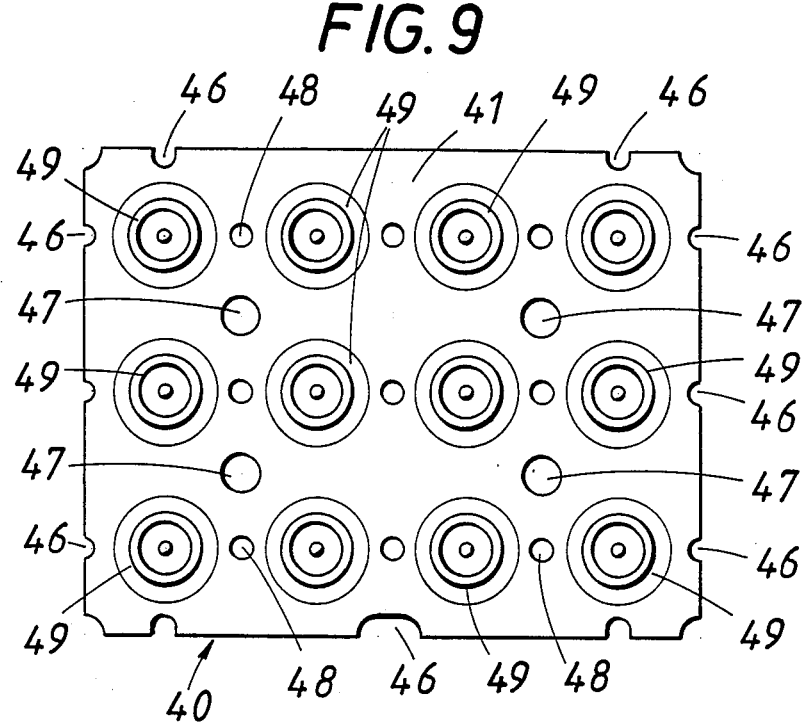
FIG. 9 is a top plan view showing a contact mat.
Figure 10:
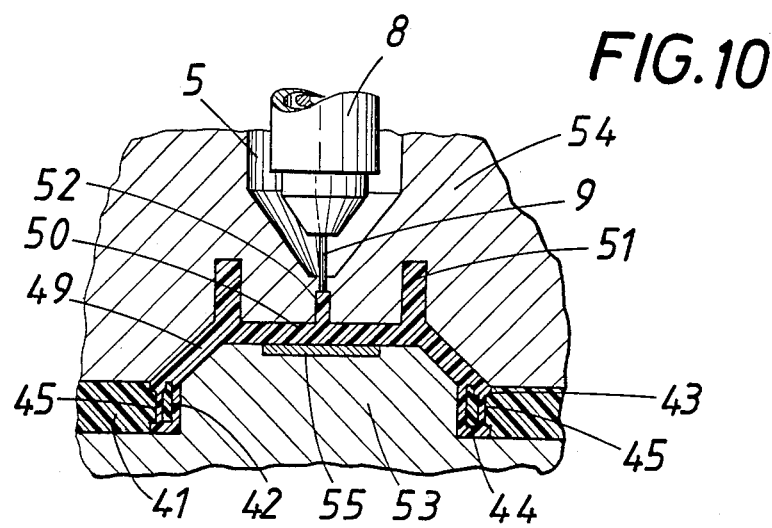
FIG. 10 is a transverse sectional view showing on a greatly enlarged scale the contact mat of FIG. 9 during the molding of the bowl-shaped humps in an injection mold.

FIGS. 7 and 8 show a change mold for making a contact mat, e.g., a contact mat having the final appearance of the contact mat which is shown in FIG. 9 and will be described hereinafter. The change mold comprises a pivotally movable or displaceable mold section and includes a first mold section 34, a second mold section 35 and a third mold section 36. In the desired final position the first and second mold sections 34, 35 enclose cavities 37, which are adapted to be supplied with a conductive silicone blend through respective injection nozzles 8 and nozzle tips consisting of hollow needles 9 in the manufacture of contact elements, particularly so-called contact tablets.

The molds 1, 2, 1a, 2a, 1b and the mold sections 34, 35, 36 are provided with heating means, which are not shown and serve to heat the injected material to the temperature required for solidification or vulcanization, e.g., to a temperature of 240° C. in the processing of certain silicone blends.

When the contact tablets 38 have been made in the cavities 37, the first mold section 34 is separated from the second mold section 35 and is operatively associated with the third mold section 36 so that the third mold section 36, the first mold section 34 and those surfaces of the contact tablets 38 which are not in contact with the first mold section 34 define a cavity 39 for molding a contact mat formed with inverted bowl-shaped humps. In said cavity the nozzle tip 9 of an injection nozzle 8 opens adjacent to each hump. The nozzles 8 may be permanently connected to the upper mold section 35 and/or 36 or may be adapted to be introduced into and retracted from the blind bores 5.

To indicate the dimensional relations it is assumed that the contact tablets 38 in the mat have a center spacing of 12 millimeters although a center spacing below 5 mm may also be adopted. The material which has been injected to the cavity 39 bonds to the contact tablets 38 so that the contact mat will be ready for use when it has been removed from the mold.

In accordance with a further feature a fourth mold section may be provided and in a third operative position of the mold that fourth mold section cooperates with the mold section 34 and the contact mat lying on said mold section 35 so that keyheads may be molded, which may be provided with the required alphanumeric characters.

In the use of the above-described injection molds 1, 2, 1a, 2a, 1b, 34, 35, 36, a reserve supply of liquid molding material is maintained in that the injecting machine provides the liquid molding material in a surplus. The pressure in the feeding system or manifold or at the outlet of the injecting machine or in the passages 10 is monitored and/or automatically controlled. When a cavity has been completely filled, there is a pressure rise, which is utilized for an automatic control of the injecting operation.

It has been mentioned hereinbefore that the mold shown in FIGS. 7 and 8 can be used to manufacture a contact mat having the general shape of the contact mat shown in FIG. 9. That contact mat 40 comprises a carrying plate, which may preferably be injection-molded from thermoplastic or thermosetting material and which is formed with apertures 42 at the locations at which inverted bowl-shaped humps are to be attached. The plate 41 is formed on its top surface with annular grooves 43, which surround respective apertures 42, and is formed on its underside with annular shoulders 44 around respective apertures 41. The annular grooves 43 and the recesses defined by the shoulders 44 are connected by spaced apart small passages 45. The plate 41 may also be formed with recesses 46 at its edges and with additional holes 47, 48, which may facilitate the installation of the plate, particularly in case of an automatic assembling, or may constitute passages for lines or fasteners.

An inverted bowl-shaped part 49 has been injection molded in contact with the plate 41 at each aperture 42. That part consists of rubber-elastic material and has preferably been made from hot-settable liquid silicone. The bowl-shaped parts 49 have a conical or bell-shaped body, a partition 50, an annular rim 51 and a sprue 52, which is centered in said annular rim 51. The bowl-shaped parts 49 are made in an injection mold 53, 54, which is similar to that shown in FIG. 8 and receives the plate 41. As the molding material is injected, it fills each cavity for molding a bowl-shaped part 49 and also fills the groove 43, the recess defined by the shoulder 44, and the passages 45 so that the bowl-shaped moldings 49 are reliably anchored to the plate 41. A metal contact consisting of a metal plate 55 may subsequently be attached.

I claim:

1. A process of manufacturing an injection molding in an injection mold which comprises two mold sections enclosing a molding cavity adapted to be supplied with molding material through an entrance opening in one of the mold sections, which process comprises maintaining the mold at a solidification temperature for the molding material, directly injecting the molding material into the cavity in a liquid state at a temperature different from the solidification temperature through a passage having a flow area not in excess of one square millimeter in a hollow needle tip at a free end of an injection nozzle extending through the entrance opening while greatly restricting the heat conduction between the hollow needle injection nozzle tip and the injection nozzle, introducing the hollow needle tip through the entrance opening into the cavity, and gradually withdrawing the hollow needle tip from the cavity during the supply of the molding material to the cavity in response to the extent to which the cavity has been filled with the molding material supplied thereto.

2. A process of injection molding a contact mat in an injection mold, the contact mat having inverted bowl-shaped humps of rubber-elastic material adapted to set to a rubber-like elasticity and comprising a carrying plate of a stiff material defining apertures for receiving the humps, the carrying plate having anchoring means at the rims of the apertures, the injection mold comprising two mold sections enclosing a plurality of molding cavity sections for molding respective ones of said humps, each of said molding cavity sections being adapted to be supplied with molding material through a respective entrance opening in one of the mold sections, maintaining the mold at a soldification temperature for the molding material, and directly injecting the molding material simultaneously into each molding cavity section in contact with said anchoring means in a liquid state at a temperature different from the solidification temperature through a passage having a flow area not in excess of one square millimeter in a tip of a respective injection nozzle centrally and perpendicularly disposed with respect to each cavity section and extending through the entrance opening thereof while greatly restricting the heat conduction between the injection nozzle tips and the injection nozzles.

* * * * *